(12) United States Patent
Connor et al.

(10) Patent No.: US 11,679,945 B2
(45) Date of Patent: Jun. 20, 2023

(54) SYSTEM FOR MOUNTING AND UNLOADING RAIL CARS AND METHODS OF USING THEM

(71) Applicants: Gerald W Connor, Wirtz, VA (US); Melvin A Richardson, Roanoke, VA (US)

(72) Inventors: Gerald W Connor, Wirtz, VA (US); Melvin A Richardson, Roanoke, VA (US)

(73) Assignee: Transloading Services, Inc., Roanoke, VA (US)

( * ) Notice: Subject to any disclaimer, the term of this patent is extended or adjusted under 35 U.S.C. 154(b) by 0 days.

(21) Appl. No.: 17/361,053

(22) Filed: Jun. 28, 2021

(65) Prior Publication Data

US 2023/0088969 A1    Mar. 23, 2023

Related U.S. Application Data

(63) Continuation of application No. 16/261,506, filed on Jan. 29, 2019, now Pat. No. 11,046,536.

(51) Int. Cl.
*B65G 67/24* (2006.01)
*B60P 1/43* (2006.01)

(52) U.S. Cl.
CPC .............. *B65G 67/24* (2013.01); *B60P 1/43* (2013.01)

(58) Field of Classification Search
CPC .. B65G 67/24; B60P 1/43; E02F 9/022; E02F 9/024; E02F 9/003; B66C 23/52; B66C 23/50

USPC ........................................................ 414/333
See application file for complete search history.

(56) References Cited

U.S. PATENT DOCUMENTS

| | | | | |
|---|---|---|---|---|
| 4,096,954 A * | 6/1978 | Buckner | ................. | B66C 23/50 414/339 |
| 5,628,606 A * | 5/1997 | Herzog | ................... | E02F 3/964 414/718 |
| 6,190,106 B1 * | 2/2001 | Richardson | ............. | E02F 9/003 414/537 |
| 6,561,742 B1 * | 5/2003 | Crawford | ................ | E02F 9/003 414/394 |
| 7,658,444 B2 * | 2/2010 | Murphy | ................. | B60R 22/28 297/472 |
| 8,393,846 B1 * | 3/2013 | Coots | ..................... | B61D 47/00 414/339 |
| 9,139,385 B2 * | 9/2015 | Walker | ................... | B65G 69/30 |
| 2003/0221338 A1 * | 12/2003 | Verseef | ................... | E01H 5/062 37/266 |
| 2005/0244255 A1 * | 11/2005 | Smith | ..................... | E02F 9/085 414/339 |
| 2007/0297882 A1 * | 12/2007 | Villar | ...................... | E02F 9/022 414/333 |
| 2017/0191865 A1 * | 7/2017 | Kvist | ...................... | B60P 1/283 |
| 2017/0328511 A1 * | 11/2017 | Wiethorn | ................ | B66C 23/00 |

* cited by examiner

*Primary Examiner* — Glenn F Myers
(74) *Attorney, Agent, or Firm* — Rhodes IP PLC; Christopher Rhodes

(57) ABSTRACT

A system for loading/unloading solid materials from an open top rail car is described. The system may comprise suitable safety features, structural reinforcement and loading features to permit operation of the system by a single operator in a safe manner. In some examples, the system comprises a crawler excavator reversibly coupled to a sled attachment to permit movement of the crawler excavator along a top surface of an open top rail car.

14 Claims, 13 Drawing Sheets

SYSTEM FOR MOUNTING AND UNLOADING RAIL CARS AND METHODS OF USING THEM

TECHNOLOGICAL FIELD

Certain configurations described herein are directed to systems that can be used to safely unload materials from rail cars. More particularly, some configurations of the system permit an operator to securely and safely load a crawler excavator on top of an open top rail car and move from rail car to rail car in a safe manner to unload solid materials from the rail cars.

BACKGROUND

Railroads use open top cars to haul a variety of bulk cargo and solid materials. Unloading of the solid materials from the top of the cars can be time consuming and unsafe, since the distance from the top of the railcar to the ground can be over ten feet in many instances.

SUMMARY

Certain configurations described herein are directed to a system that comprises a crawler excavator in combination with a loading ramp. The crawler excavator comprises one or more integral safety features to permit an operator of the crawler excavator to safely move in and out of the crawler excavator cab. The crawler excavator may also comprise one or more reinforced areas to withstand the added weight of the solid materials as the solid materials are being unloaded from the rail car. The ramp may comprise an integral loading feature to permit positioning of the ramp on the rail car solely by the operator in the crawler excavator.

In one aspect, a method of unloading solid materials from an open top rail car is described. In some examples, the method comprises providing an independently powered vehicle operated by an operator in a cab of the vehicle, the vehicle comprising (i) at least one movable arm supported loading member for loading/unloading, wherein the vehicle comprises a drive mechanism and drive members and is configured to rotate on top of the drive mechanism and drive members to operate its loading member through 360 degrees to either side as well as to front and rear of itself, so that the vehicle can operate selectively to its front as well as its rear, (ii) a sled configured to reversible couple to the vehicle and comprising outriggers sized and arranged to span a width of the open top rail car to stabilize the vehicle when it is on top of the open top rail car and permit the drive mechanism to float above the solid material in the open top rail car, wherein the sled is configured to frictionally engage a top surface of the open top rail car and slide along the top surface of the open top rail car, and (iii) orthogonal reinforcing members positioned under the cab of the vehicle and between the cab and the sled, wherein the orthogonal reinforcing members are sized and arranged to prevent sag of the vehicle as the drive mechanism of the vehicle floats above the solid rail car. The method may also comprise positioning the independently powered vehicle on top of the open top rail car and above the solid material in the rail car to permit unloading of the solid material in the rail car when the drive mechanism of the vehicle floats above the solid material in the open top rail car without.

In certain examples, the method may further comprise moving the positioned independently powered vehicle laterally along a top surface of the open top rail car by engaging the loading member to an end of the open top rail car to laterally slide the sled along the top surface of the open top rail car. In other instances, the method may comprise engaging a front surface of the drive members to an end of the open top rail car to move the independently powered vehicle from the open top rail car to an adjacent open top rail car by driving over the end of the open top rail car and an end of the adjacent open top rail car to position the sled on a top surface of the adjacent open top rail car so the independently powered vehicle floats above the adjacent open top rail car.

In some embodiments, the positioning of the vehicle comprises placing a ramp sized and arranged to be placed on an end of the open top rail car to permit the independently powered vehicle to drive up the placed ramp and onto the top of the rail car using the drive members, wherein the ramp comprises a loading feature configured to reversibly couple to a loading feature of the loading member of the vehicle to permit placement of the ramp by the loading member of the vehicle. In some instances, the ramp is further configured to receive the vehicle and permit transport of the vehicle on top of the ramp from one site to another site. In further examples, the ramp comprises a plurality of members comprising longitudinal members and cross members to prevent substantial sag of the ramp as the vehicle is driven on the ramp and on top of the open top rail car.

In certain embodiments, the vehicle comprises a first safety tie off point within the cab of the vehicle and a second tie off safety point external to the cab of the vehicle, wherein each tie off point is configured to receive a safety hook from a harness worn by the operator of the vehicle.

In some embodiments, the vehicle is a crawler excavator comprising tracked treads as part of the drive members, wherein the treads are spaced to permit floating of the treads above the solid material in the open top rail car when the sled frictionally engages the top surface of the open top rail car and are arranged to engage the end surface of the open top rail car to permit the crawler excavator to drive over the end of the open top rail car and onto an end of an adjacent open top rail car to move the sled from the top surface of the open top rail car onto a top surface of the adjacent open top rail car.

In other embodiments, the sled comprises wheels that engage an interior surface of the open top rail car to stabilize the sled when the vehicle is on top of the open top rail car.

In further embodiments, the solid material unloaded from the open top rail car is coal.

In another aspect, a system for unloading solid materials from an open top rail car comprises an independently powered vehicle operated by an operator in a cab of the vehicle, the vehicle comprising at least one movable arm supported loading member for loading/unloading, wherein the vehicle comprises a drive mechanism and drive members and is configured to rotate on top of the drive mechanism and drive members to operate its loading member through 360 degrees to either side as well as to front and rear of itself, so that the vehicle can operate selectively to its front as well as its rear, wherein the vehicle further comprises at least one safety tie off point configured to receive a safety harness attachment of the operator. The system may also comprise a sled coupled to the vehicle and comprising outriggers sized and arranged to span a width of the open top rail car to stabilize the vehicle when it is on top of the open top rail car and floating above the solid material in the open top rail car, wherein the sled is configured to frictionally engage a top surface of the open top rail car and slide along the top surface of the open top rail car. The vehicle may further comprise orthogonal reinforcing members positioned under the cab and between the cab and the sled, wherein the orthogonal reinforcing members are sized and arranged to prevent sag of the vehicle as it is floating above the solid material in the open top rail car and is unloading the solid material from the open top rail car.

In some embodiments, the system comprises a ramp sized and arranged to be placed on an end of the open top rail car to permit the vehicle to drive up the placed ramp and onto the top of the rail car, wherein the ramp comprises a loading feature configured to reversibly couple to a loading feature of the loading member of the vehicle to permit placement of the ramp by the loading member of the vehicle. In other embodiments, the ramp comprises a plurality of members comprising longitudinal members and cross members to prevent substantial sag of the ramp as the vehicle is driven on the ramp and on top of the open top rail car. In certain examples, a width of the outriggers is hydraulically adjustable after the vehicle is on top of the railcar.

In other examples, the vehicle is a crawler excavator comprising tracked treads as part of the drive members, wherein the treads are spaced to permit the treads to float above the solid material in the open top rail car when the sled frictionally engages the top surface of the open top rail car, and wherein the tracked treads are arranged to engage an end of the open top rail car to permit the crawler excavator to drive over the end of the open top rail car and onto an end of an adjacent open top rail car to move the sled from the top surface of the open top rail car onto a top surface of the adjacent open top rail car. In some embodiments, the vehicle, e.g., the crawler excavator, comprises a first safety tie off point within the cab of the vehicle and a second tie off safety point external to the cab of the vehicle.

In some instances, the vehicle further comprises a seat sensor configured to generate an audible alarm when the operator exits the seat or a door sensor configured to generate an audible alarm when the operator opens a door of the cab.

In some embodiments, the loading member is a bucket, and the bucket comprises a non-stick coating on an interior surface of the bucket to prevent the solid material from sticking to the bucket.

In other examples, the system may comprise a grapple as part of, or as, a loading member.

In some examples, the sled comprises wheels that engage an interior surface of the open top rail car to stabilize the sled when the vehicle is on top of the open top rail car.

In another aspect, a ramp configured to transport a vehicle to a rail car site and permit loading of the vehicle on top of the rail car using the ramp is disclosed. In certain instances, the ramp comprises a ramp frame comprising a pair of longitudinal members coupled to each other through at least a pair or cross members, wherein the longitudinal members are spaced apart from each other to permit a respective track of a crawler excavator vehicle to engage a top surface of one of the longitudinal members. The ramp may also comprise a set of wheels coupled to the longitudinal members to permit transport of the ramp over a road. The ramp may also comprise a tow hitch positioned at a first end of the ramp and configured to couple to a tow vehicle to permit towing of the ramp by the tow vehicle, wherein the first end of the ramp further comprises a loading feature configured to reversibly couple to a loading member of the crawler excavator, wherein when the loading feature is coupled to the loading feature of the crawler excavator and the ramp is lifted the ramp remains substantially vertical to permit placement of the ramp at an end of an open top rail car, and wherein the loading feature is configured to automatically disengage the loading member when the crawler excavator climbs on top of a rail car using the placed ramp.

In certain embodiments, the ramp frame comprises layered longitudinal members and cross members to prevent sagging of the ramp when the ramp is placed at the end of the open top rail car and when the crawler excavator is crawling up the ramp.

In other embodiments, the integral loading feature is configured as a clevis that can engage a loading feature of a bucket of the crawler excavator to permit the crawler excavator to lift the ramp vertically and place the ramp at the end of the open top rail car. In some instances, the clevis is configured to automatically release from the loading feature of the crawler excavator when the crawler excavator is crawling up the ramp. In other examples, the clevis is configured to automatically reengage the loading feature of the crawler excavator when the crawler excavator is crawling down from the top of the open top rail car on the ramp.

In certain configurations, the ramp comprises outriggers configured to engage a side surface of the open top rail car to keep the ramp from moving laterally. In other embodiments, a top surface of the pair of longitudinal members comprise a high friction material to provide increased traction to a track of the crawler excavator that engages the top surface of the pair of longitudinal members.

In some examples, the ramp comprises a tailgate configured to prevent forward and backward motion when the ramp is engaged to the end of the open top rail car.

In other instances, the ramp comprises a second loading feature configured to reversibly couple to the loading member of the crawler excavator, wherein when the loading feature and the second loading feature is coupled to the loading member of the crawler excavator and as the ramp is lifted the ramp remains vertical to permit placement of the ramp at the end of an open top rail car, and wherein the loading feature and the second loading feature are configured to automatically disengage the loading member when the crawler excavator climbs on top of a rail car using the placed ramp. In further examples, the loading feature and the second loading feature are positioned in a same plane along the ramp frame.

In an additional aspect, a sled attachment configured to reversibly couple to an independently powered vehicle is described. In some configurations, the sled attachment comprises a frame comprising at least a pair of longitudinal members coupled to each other through at least a pair of cross members, wherein the frame is configured to reversibly couple to the independently powered vehicle at a top surface of the frame and to frictionally engage a top surface of an open top rail car at a bottom surface of the pair of cross members or a bottom surface of the pair of longitudinal members. The sled attachment may also comprise at least a pair of outriggers extending laterally from the frame and each configured to engage an outer top edge of a respective side of the open top rail car, wherein the outriggers are positioned such that they are in front of and behind the vehicle when the frame is coupled to the vehicle, wherein a width of the outriggers is adjustable by a vehicle operator in a cab of the vehicle. The sled attachment may also comprise skid means on each of said outriggers to engage the outer top edges the sides of a rail car to be loaded/unloaded by said vehicle, wherein the outriggers are coupled to the longitudinal members and positioned to permit the vehicle to move on its drive means when the vehicle is not on top the rail car and to permit the vehicle to float above the solid material when the vehicle is on top of the rail car, and wherein the outriggers are configured to engage the outer top edge of a respective side of the open top rail car when the vehicle is on top of the rail car to stabilize the vehicle during unloading of solid material in rail car.

In certain examples, the frame further comprises wheels positioned to engage an upper interior surface of the open top rail car when the vehicle is on top of the rail car. In other examples, the sled attachment ramp comprises gussets between the longitudinal members and the cross members to provide added strength. In some embodiments, the sled attachment is configured to reversibly couple to the vehicle through orthogonal members that couple the sled attachment to the vehicle and prevent sag of the vehicle when it is on top of the rail car and floating above the solid material. In other embodiments, the skid means comprises an anti-icing material on a surface that engages the outer top edge of the open top rail car.

In another aspect, a crawler excavator configured to reversibly couple to a sled attachment at a lower surface of the crawler excavator to permit the coupled crawler excavator and sled attachment to move safely along a top surface of an open top rail car while the vehicle is floating above solid material in the open top rail car to unload the solid material from the open top rail car is provided. In some configurations, the crawler excavator comprises a cab comprising an engine compartment, tracked treads operatively coupled to an engine in the engine compartment to permit movement of the tracked treads by the engine, an arm coupled to the cab at one end and coupled to a loading member at an opposite end, wherein the cab comprises orthogonal reinforcing members positioned below the cab and between the cab portion and the sled attachment at a site where the crawler excavator reversibly couples to the sled attachment, wherein the orthogonal reinforcing members are sized and arranged to prevent sag of the crawler excavator when the crawler excavator is on top of the open top rail car and floating above the solid material in the rail car.

In one embodiment, the crawler excavator comprises a safety tie off point in the cab portion, wherein the safety tie off point is configured to receive an attachment point of a safety harness of an operator in the cab portion. In another embodiment, the crawler excavator comprises a safety tie off point external to the cab, wherein the safety tie off point is configured to receive an attachment point of a safety harness of an operator when the operator is exiting the cab. In an additional embodiment, the crawler excavator comprises a safety tie off point in the cab, wherein the safety tie off point is configured to receive an attachment point of a safety harness of an operator in the cab. In some configurations, the crawler excavator comprises at least two safety tie off points external to the cab.

In another aspect, a crawler excavator configured to reversibly couple to a sled attachment at a lower surface of the crawler excavator to permit the coupled crawler excavator and sled attachment to move safely along a top surface of an open top rail car while the vehicle is floating above solid material in the open top rail car to unload the solid material from the open top rail car comprises a cab comprising an engine compartment, tracked treads operatively coupled to an engine in the engine compartment to permit movement of the treads by the engine; and an arm coupled to the cab at one end and coupled to a loading member at an opposite end, wherein the cab comprises at least one safety tie off point external to the cab and configured to reversibly couple to an attachment point of a safety harness of an operator in the cab.

Additional aspects, features, embodiments and configurations are described in more detail below.

BRIEF DESCRIPTION OF THE SEVERAL VIEWS OF THE DRAWINGS

Certain configurations are described below with reference to the figures in which.

It will be recognized by the skilled person in the art, given the benefit of this disclosure, that the dimensions in the figures are not necessarily shown to scale. Various components may be enlarged, distorted or otherwise shown in a disproportionate manner to facilitate a better understanding of the technology described herein.

DETAILED DESCRIPTION

Certain configurations of a vehicle configured to mount an open top railcar, e.g., by crawling up a ramp positioned at an end of the open top railcar are described. The vehicle typically comprises an engine, motor, fuel cell, battery or other means that can be used to drive one or more wheels, tracks or other devices that can move the vehicle forward and backward. In some instances, the vehicle can be configured with parallel tracks, e.g., parallel treaded tracks, that can engage a surface to permit the vehicle to mount a rail car. For example, the vehicle can be configured as a backhoe, a crawler excavator or other vehicles that comprise a loading member such as, for example, a bucket, a scoop, a grapple or other structure that can remove solid material from the rail car and place or dump it into another container or at another site outside of the rail car interior. Alternatively, the vehicle could be used to load solid material into the rail car if desired. Illustrative solid materials include, for example, coal, timber, rocks, ash, sand or other materials that can be loaded/unloaded using a loading member.

Figure 1:
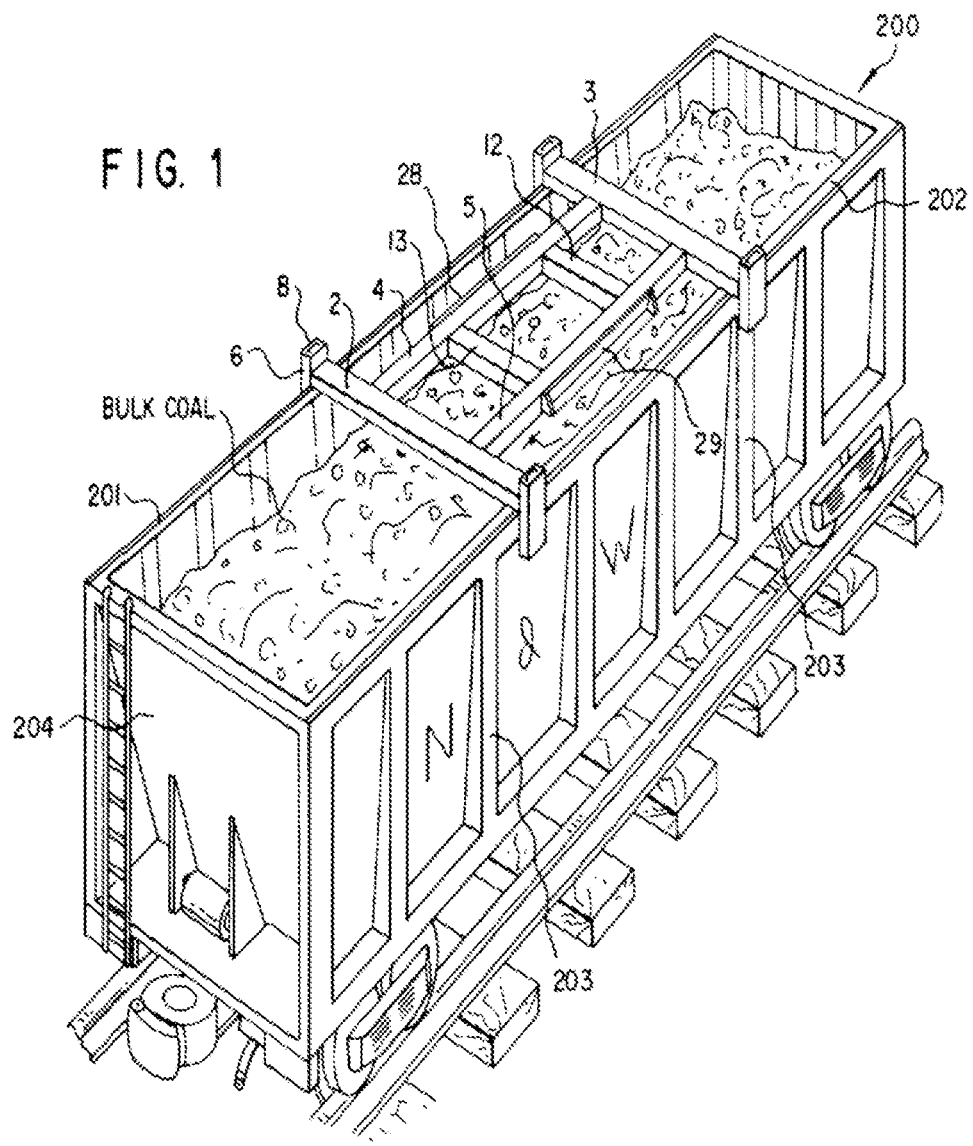
FIG. 1 is a perspective view showing a sled attachment disposed on top of an open top rail car, in accordance with some embodiments.

Referring to FIG. 1, an illustration of an open top rail car 200 is shown. The rail car 200 typically is produced using steel or similarly strong reinforced sides such as a hopper car with various bay configurations, an ore car or a gondola car. For purposes of illustration, the car shown is a hopper car with a load of solid material, e.g., coal, therein although the load can be any discrete or fungible load. The rail car 200 comprises ends such as end 204, which sometimes are sloped as shown here to allow the coal to slide out the hopper bay chute if the car 200 has one. The rail car 200 may comprise reinforced sides such as side 203 and tops of sides 201 and 202. The reinforcing helps resist the outward pressure of the bulk solid material in the rail car 201. Mounted atop the car 200 is a sled comprising outrigger beams 2 and 3 joined together by longitudinal beams 4 and 5. Cross members 12 and 13 couple the longitudinal members together and there can be elongated brackets 28 and 29 by which the frame assembly is reversibly coupled to an underside of the vehicle (not shown). As noted herein, one or more orthogonal reinforcing members can extend from the sled or the vehicle to provide reinforcement and added strength so the vehicle does not sag or drop into the rail car during a loading/unloading operation. For example, a reinforcing member may be positioned orthogonal to a horizontal plane that is tangential to a lower surface of the tub to assist in preventing sagging of the crawler or components thereof.

Figure 2:
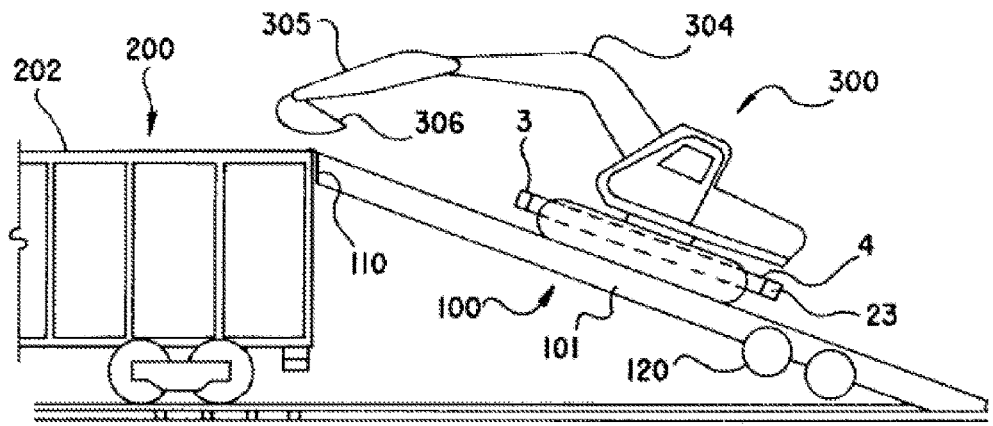
FIG. 2 is a side view of a system comprising a ramp and a crawler excavator reversibly coupled to a sled attachment, in accordance with some embodiments.
Figure 3:
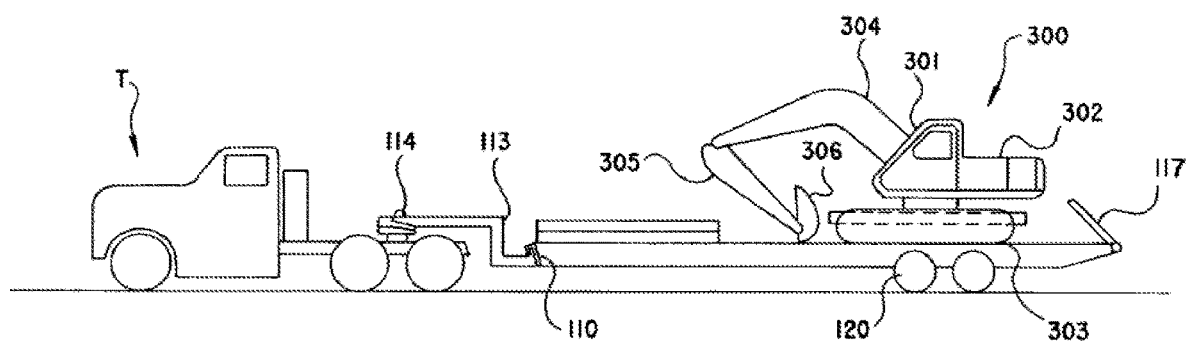
FIG. 3 is an illustration showing the ramp in use as a trailer for the crawler excavator/sled attachment system, in accordance with some embodiments.

In certain examples, the vehicle can be configured as a crawler excavator comprising a reversibly coupled sled with outriggers and can be used in combination with a ramp/trailer to permit the crawler excavator to crawl up the ramp and on to the top of the rail car. A generalized illustration is shown in FIGS. 2 and 3. The ramp/trailer 100 includes a trailer hitch 114 at a forward end 113. A top plate 110 is present that can be placed onto an end of the rail car 200 to assist in retention of the ramp 100 on the end of the rail car 200. For example, the top plate 110 can be hooked onto an end of the rail car 200 to permit the crawler 300 to climb up on the ramp/trailer 100 and onto a top surface 202 of the railcar. The crawler 300 is shown as comprising a cab 301 with an engine compartment 302, treads 303, a main arm 304, an extension arm 305 and a loading member 306 which in this configuration is a 306. The crawler 300 comprises a track 23 that can frictionally engage a longitudinal member or beam 101 on the ramp 100 to crawl up the ramp 100 and mount the rail car 200. While not shown, the ramp 100 typically comprises two or more parallel beams to permit a respective track of the crawler 300 to frictionally engage a respective beam on the ramp 100. During the mounting operation, the tracks can engage the end of the rail car 200 to permit the excavator to drive over the end of the rail car 200. This movement causes the sled to frictionally engage the top surfaces of the sides 201, 202 of the rail car and drops the excavator tracks down into the open top rail car 200. The crawler floats above the solid material as it is being unloaded from the rail car 200. As noted below, this floating exerts substantial stress on the components of the crawler excavator and reinforcement features can be present to prevent sag or damage to the excavator during the loading/unloading operation. Once the crawler 300 enters the area of the rail car top, the ramp 100 can be removed by another crawler and used to ascend other cars on different rail sidings, or the ramp can stay in place and used to permit the crawler 300 to demount the rail car once the solid material in all rail cars is unloaded.

As solid material is being unloaded from the rail car 200, the excavator can slide along a top surface of the rail car using the loading member 306. For example, the loading member 306 can engage the solid material or an end of the rail car 200 to force the sled to be pulled laterally, e.g., horizontally, along the top surface of the rail car 200. This movement repositions the sled and permit loading of solid material at other areas of the rail car. Once the solid material is unloaded from the rail car 200, the crawler 300 can move from one rail car to an adjacent rail car using the drive mechanism and drive members, e.g., using an engine coupled to tracked treads to drive the tracked treads. For example, a front surface of the tracked treads can engage the end 204 of the rail car 200 so the crawler excavator drives up onto the end 204. This movement lifts the sled off of the top surface of the rail car 200. Continued movement of the treads over the end 204 and onto an end of an adjacent rail car repositions the sled onto a top surface of the adjacent rail car. As the crawler excavator continues to move, eventually the treads drop into or floats above the solid material in the adjacent rail car and the sled frictionally engages the top surface of the adjacent rail car.

FIG. 3 shows the crawler 300 loaded onto the assembled trailer-ramp with portion 113 attached to the ramp 100. The whole assembly can be moved by being towed by truck T from one location to another quickly. Once moved to a desired site, the crawler can be driven off the ramp/trailer 100, and then ramp/trailer 100 can be disconnected from the truck T. As discussed further below, the crawler 300 may comprise one or more features, e.g., a loading feature such as a hook, clevis, or other structural features, to permit placement of the ramp 100. In some configurations, the ramp 100 may comprise an integral loading feature to permit the crawler 300 to place the ramp 100 at the side of the rail car.

Figure 4:
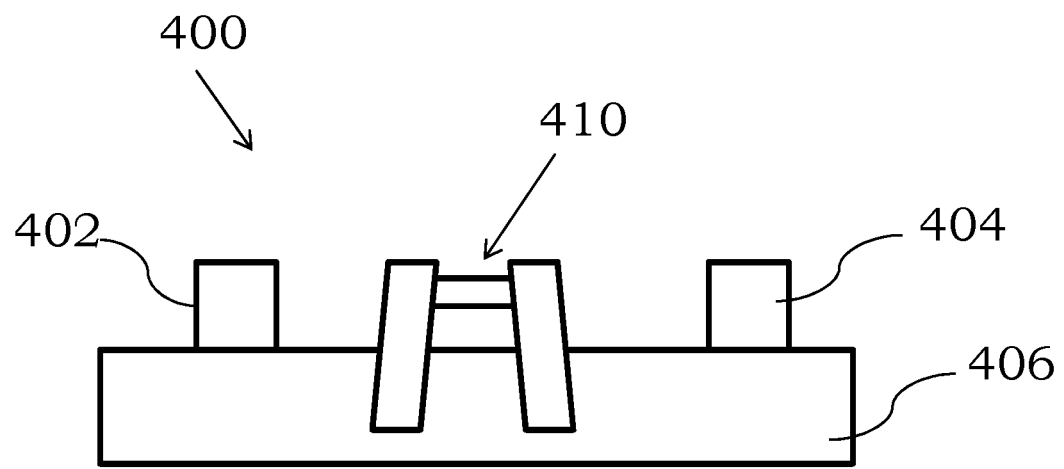
FIG. 4 is a front view of a ramp showing a loading feature that can be used to reversibly couple to a loading feature on a bucket, in accordance with some embodiments.
Figure 14:
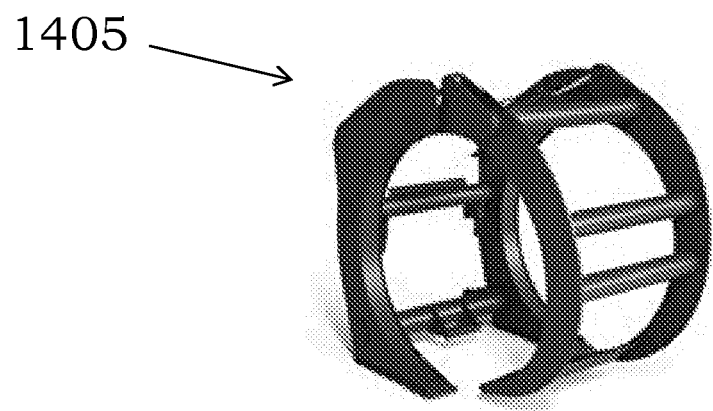
FIG. 14 is an illustration of a grapple that may be present on the vehicle in accordance with certain examples.

Referring to FIG. 4, a front view of a ramp 400 is shown that comprises a loading feature 410 positioned between two longitudinal beams 402, 404 which are coupled to each other through a cross member 406. The tracks of the crawler frictionally engage the longitudinal beams 402, 404 at a top surface to permit the crawler to climb up on the rail car. The loading feature 410 can be configured as a reversible attachment point that can reversibly couple to the loading member, e.g., a bucket, a grapple 1405 as shown in FIG. 14, etc., of the crawler. For example, after the crawler is removed from the ramp/trailer, the loading feature of the loading member can be used to reversibly couple a hook, clevis or other attachment means on the loading feature bucket to the loading feature 410 to permit the operator in the crawler to position the ramp 400 at a side surface of the rail car by moving the bucket. Desirably, the hook, clevis or other attachment means on the loading member reversibly couples to the attachment point 410 through a front surface, e.g., by positioning the loading feature of the loading member adjacent to the front surface of the attachment point 410 and then moving the bucket backward until the hook, clevis or other attachment means on the loading member engages the loading feature 410. The loading member can remain coupled to the loading feature 410 as the ramp 400 is placed at a side of the rail car. The crawler can then crawl up onto the placed ramp, and as the crawler moves forward, the hook, clevis or other attachment means on the loading member automatically disengages the loading feature 410 as a result of forward movement of the crawler. In this manner, the operator can remain in the cab of the crawler the entire time and need not exit the cab during positioning of the crawler on top of the rail car. If desired, a chain, rope or other means can be present between the loading feature of the loading member and the loading feature of the ramp to reversibly couple the loading member to the loading feature 410 for at least some period.

Figure 5A:
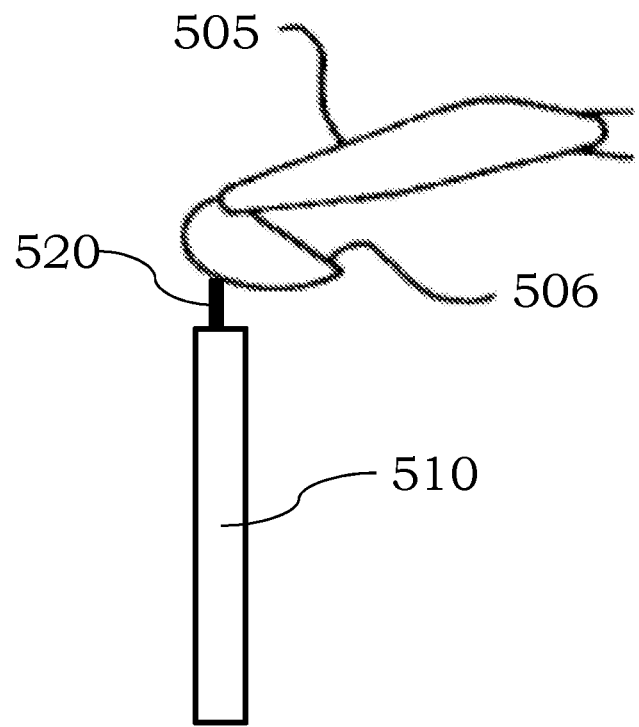
FIG. 5A is an illustration showing the bucket reversibly coupled to a ramp to permit placement of the ramp at a side of a rail car.
Figure 5B:
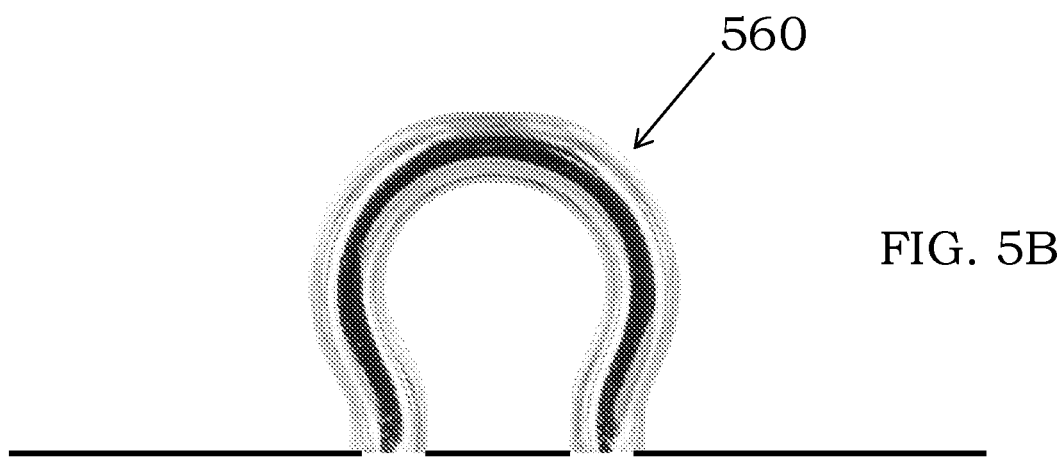
FIG. 5B is an illustration showing one configuration of a loading feature of a ramp or bucket or both, in accordance with some embodiments.
Figure 5C:
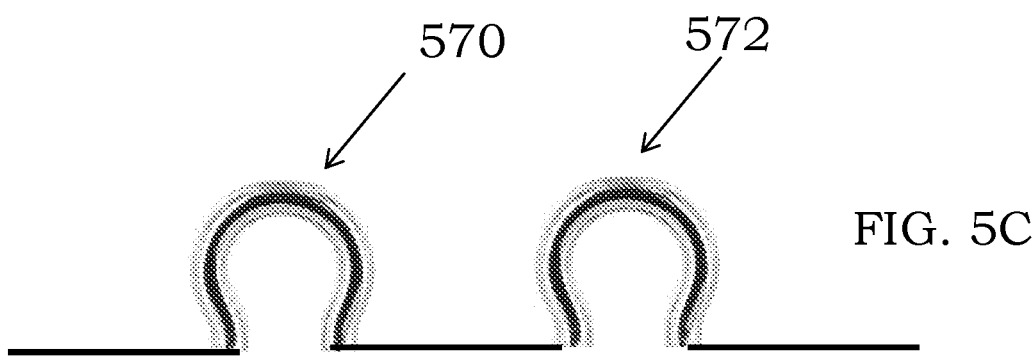
FIG. 5C is an illustration showing one configuration of two loading features present on a ramp or bucket or both, in accordance with some embodiments.

While the loading feature of the ramp can take various configurations, shapes and sizes, the loading feature of the ramp is desirably configured such that the ramp hangs vertically when engaged by the loading member of the crawler. An illustration is shown in FIG. 5A, where a loading member configured as a bucket 506 is coupled to the ramp 510. The ramp 510 hangs vertically as the arm 505 of the vehicle is moved upward. A chain 520 couples the bucket 506 to the ramp 510. The arm 505 can be lifted to a suitable height to lift the ramp 510 off the ground (to at least some degree) to permit placement of the ramp 100 against an end of the rail car. As the arm 505 is lowered, tension in the chain 520 is released which causes the bucket 506 to disengage from the loading feature of the ramp 510. The exact positioning and nature of the attachment points on the bucket 506 and the ramp 510 can vary. One illustration of an integral clevis 560 on a surface of a bucket is shown in FIG. 5B. The ramp may also comprise a similar integral clevis, and a chain with a hook at each end can be used to couple the ramp to the bucket. Alternatively, a hook can be present on the bucket and can couple to the clevis of the ramp to permit positioning of the ramp. Where the loading member comprises a clevis or other attachment feature, the attachment feature can be present on a bottom surface, sides surfaces, a top surface or other areas of the loading member. Alternatively, the attachment point could be moved to the arm of the vehicle if desired, and the loading member can be used to stabilize the ramp to reduce swaying as the ramp is being positioned. In some embodiments as shown in FIG. 5C, two loading features 570, 572 can be present on the ramp (or the loading member or both) to further stabilize the ramp as it is being placed against a side of the rail car.

Figure 6A:
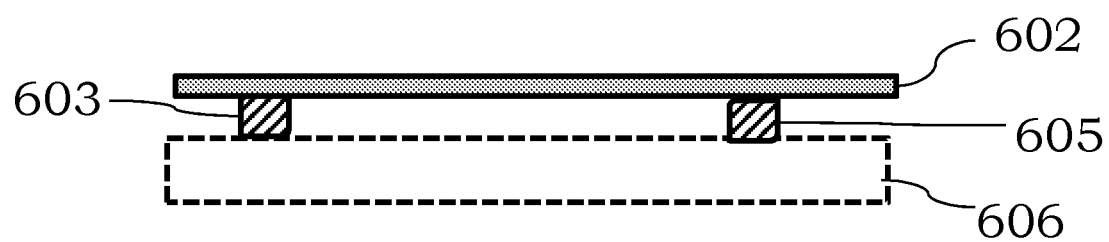
FIG. 6A is a side view showing various members of a sled attachment.
Figure 6B:
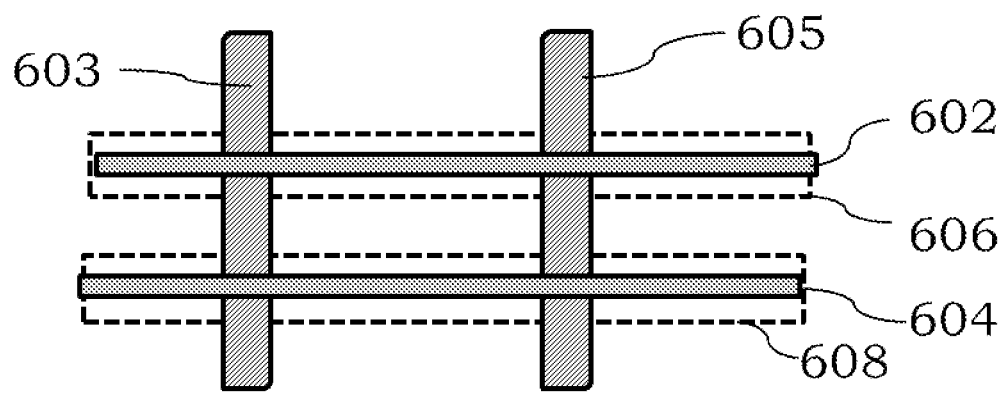
FIG. 6B is a top view of the sled attachment of FIG. 6A, in accordance with some examples.

In some embodiments, the weight of the vehicle on the ramp can result in substantial stress being applied to the ramp. The ramp typically only contacts the ground at one end and the top of the rail car at the other end. To avoid bending or collapse of the ramp under the weight of the crawler, sufficiently sized cross members can be present between longitudinal beams of the ramp to support the weight of the vehicle. Illustrations are shown in FIGS. 6A and 6B where a plurality of members are coupled to each other to provide added strength to the ramp. Without wishing to be bound by any one particular configuration, a single cross member positioned underneath the guide rails of the ramp generally does not provide sufficient strength to permit multiple repeated uses of the ramp. When a ramp 600 comprises a guide member 602 coupled to a first cross member 603 and a second cross member 605 each of which is coupled to a longitudinal member 606 positioned underneath the cross members 603, 605, added ramp strength can be achieved. If desired, at least one additional longitudinal or guide member 608 can be present and positioned underneath another guide rail 604 of the ramp so each track of the crawler can engage a respective guide rail on the ramp. The presence of multi-layered support members on the ramp disperses the weight of the vehicle as it crawls up the positioned ramp and decreases the likelihood of ramp bending or failure. The guide rails may comprise a high friction material, e.g., rubber, silica, sand, etc., which can be permanently present on the guide rails or may be added by an operator prior to crawling up the guide rails. If desired, anti-icing materials such as glycols, alcohols, sand, sugars or other materials can be disposed on a top surface of the ramp where the drive members of the vehicle engage the ramp to prevent the vehicle from sliding off of the ramp during use.

Figure 7A:
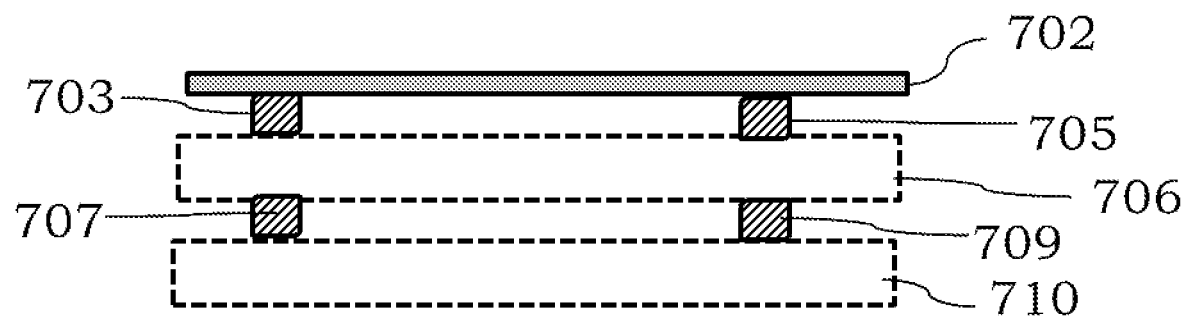
FIG. 7A is a side view showing various members of a sled attachment.
Figure 7B:
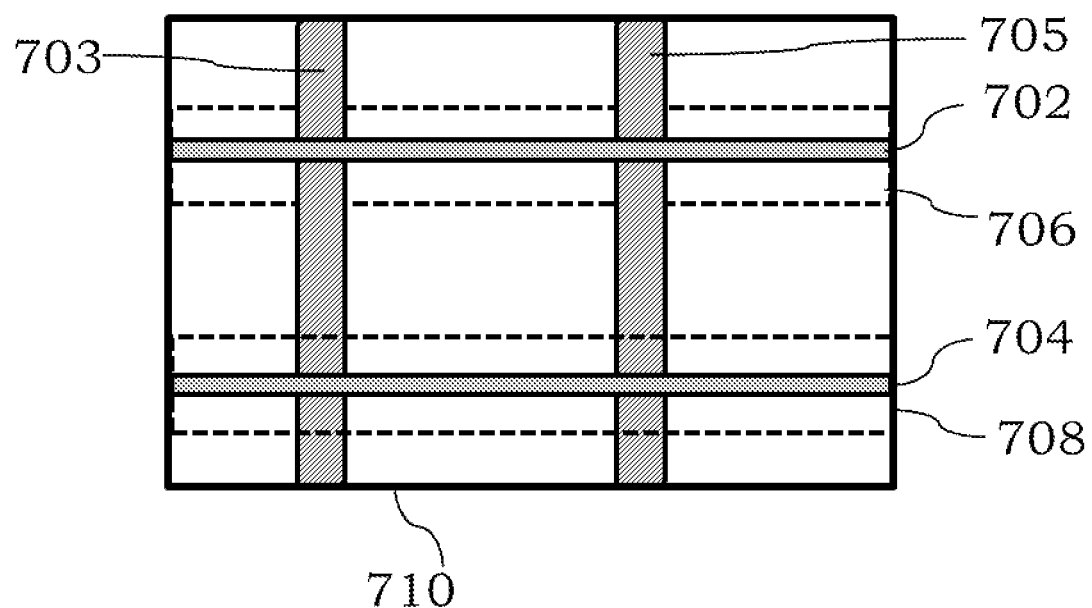
FIG. 7B is a top view of the sled attachment of FIG. 7A, in accordance with some examples.

In some examples, the ramp may comprise three or more different layered sets of longitudinal and cross members to increase overall strength of the ramp. A side view is shown in FIG. 7A and a top view is shown in FIG. 7B, where guide rails 702, 704 are positioned above first cross members 703, 705. A first set of longitudinal members 706, 708 are positioned below the first cross members 703, 705. A second set of cross members 707, 709 are positioned below the longitudinal members 706, 708. Another set of longitudinal members, which includes longitudinal member 710 (see FIG. 7A) can be positioned below the cross members 707, 709. The entire ramp may be constructed within a frame 710, which typically is smaller than the maximum allowed width on public roads to permit transport of the vehicle on the ramp to a site over a public road.

The various longitudinal and cross members in FIGS. 6A-7B can be made of steel, aluminum, carbon fiber or other materials as desired. Where multiple different layered longitudinal and cross members are present, it may be desirable to produce some of the longitudinal and cross members from aluminum to decrease the overall weight of the ramp/trailer, which will reduce the overall combined gross vehicle weight during transport of the crawler to a site.

Figure 7C:
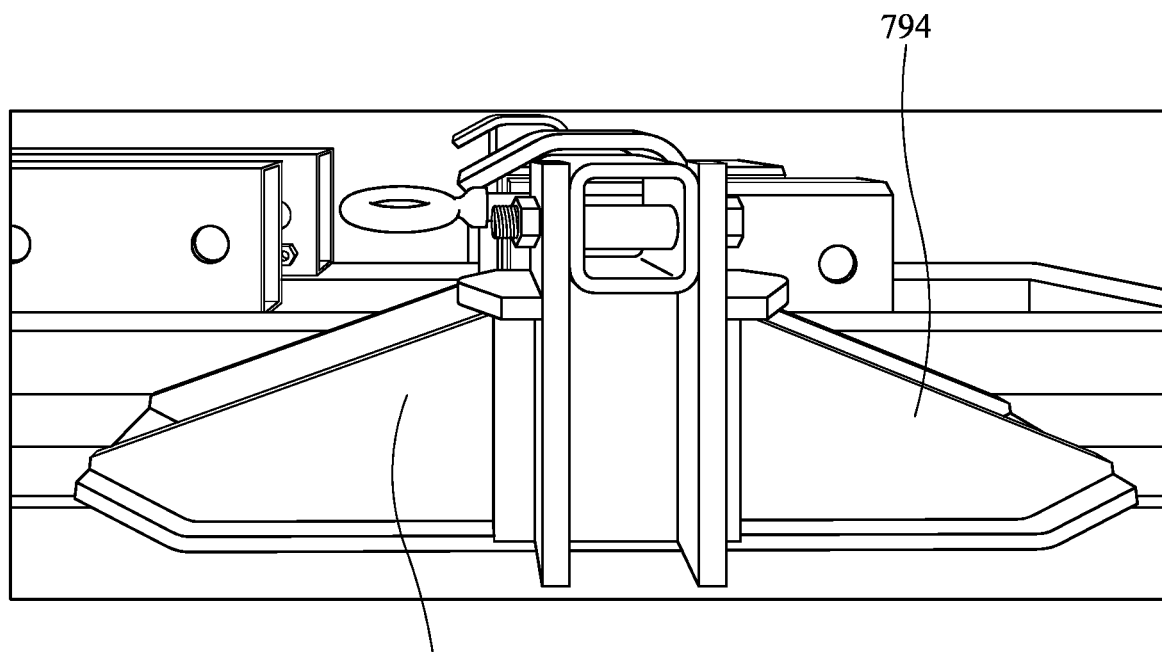
FIG. 7C is an illustration showing optional gussets present between longitudinal members and cross members of the sled attachment, in accordance with some embodiments.

In certain embodiments, the sled that is reversibly coupled to the vehicle may also comprise one or more suitable features to increase the overall strength of the sled. For example, one or more gussets or other types of reinforcing structures can be present in the sled attachment to add strength. Referring to FIG. 7C, gussets 792, 794 are shown as being present and coupled to a cross member and a longitudinal member of the sled attachment to provide added strength to the sled attachment. Gussets could also be present between the cross member and the guide member as desired to provide reinforcement.

Figure 8:
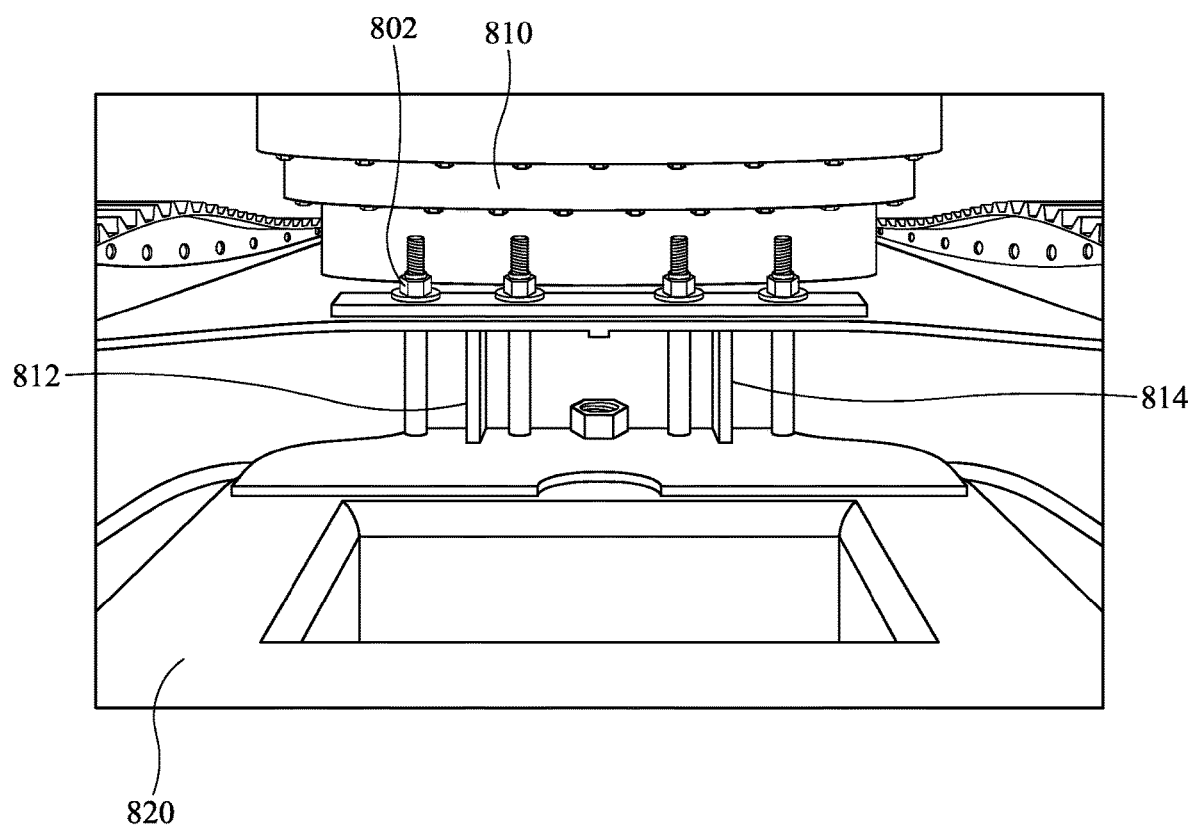
FIG. 8 is an illustration showing bolts used to couple the sled attachment to the crawler excavator and the presence of orthogonal reinforcing members at a bottom surface of the excavator, in accordance with some embodiments.

In certain embodiments, loading of the crawler on top of the rail car results in engagement of the top surface of the rail car by a bottom surface of the sled. As noted herein, the entire crawler generally "floats" over the solid material in the rail car and may not contact the rail car or the solid material directly. As a result, tremendous stress is placed on the center of the tub of the crawler as it wants to flex downward under the weight of the crawler. To avoid flexing and/or failure of the crawler tub, a plurality of orthogonal reinforcing members, e.g., two, three, four, five or more independent reinforcing members, can be placed between the tub and the sled attachment to reduce flexing and/or bending at this site. As noted herein, a longitudinal plane of the reinforcing members can be positioned about ninety degree from a horizontal plane tangential to a lower surface of the body of the crawler An illustration of one configuration is shown in FIG. 8. The body 810 of the crawler can reversibly couple to the sled 820 through one or more nuts and bolts, such as bolt 802, to permit removal of the sled 820 from the body 810 of the crawler for service or repair. Orthogonal members 812, 814, e.g., members positioned about 90 degrees to a horizontal plane of the tube of the crawler, are shown as being present above the sled 820 and between the sled 820 and the body 810 to provide structural reinforcement to the tub body 810. In this configuration, the members 812, 814 can be produced using steels or other materials, e.g., steel plate, to enhance rigidity. The members 812, 814 can be permanently placed, e.g., welded, or can be removable to permit replacement of the members 812, 814 as desired. The reinforcing members 812, 814 desirably do not alter or deter rotational movement of the body 810 and permits rotation of the cab of the crawler by 360 degrees. The exact number of reinforcing members may vary from one to about four or more. If desired, the reinforcing members 812, 814 could also be coupled to the sled 820, but this configuration would require cutting of the members 812, 814 to permit removal of the sled 820 from the body 810. The reinforcing members 812, 814 need not be orthogonal or positioned in the same manner. Angles less than or greater than ninety degrees can be used, and reinforcing members of various shapes, e.g., curved shapes, may be used if desired.

Figure 9:
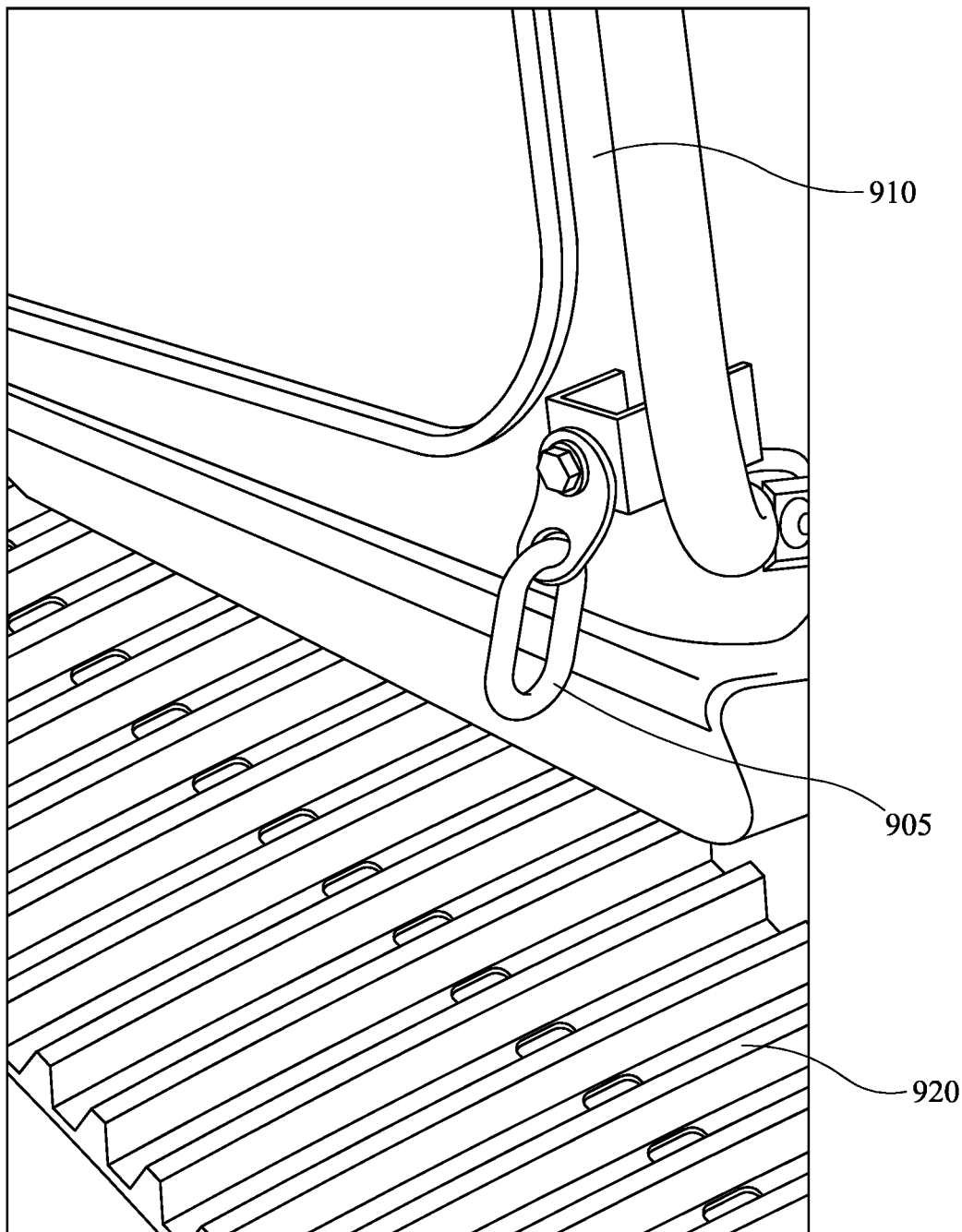
FIG. 9 is an illustration showing an external safety tie off point, in accordance with some embodiments.

In some examples, an operator of the crawler may need to exit the cab of the crawler during the material removal operation. Since the crawler cab can easily be more than ten feet off the ground when the vehicle is positioned on top of the rail car, there is substantial risk that the operator may fall from the crawler and sustain injury or death. To avoid such injury or death, the crawler may comprise one or more safety tie off points that permit attachment of a safety harness attachment or other means. For example and referring to FIG. 9, a tie off point 905 is shown as being attached to an outside surface of a crawler excavator cab 910 and positioned above a track 920 of the crawler excavator. An operator in the cab 910 can couple his safety harness attachment to the tie off point 905 prior to exiting the cab 910. In the event the operator loses their footing or falls from the excavator, the safety harness attachment will prevent the operator from landing on the ground and injuring themselves. The safety harness may comprise a fall arrestor, for example, so if the operator falls the downward movement of the rope of the safety harness will result in limited downward movement of the rope. This feature of the harness, along with the tie off point of the vehicle, prevents the operator from contacting the ground if a fall does occur.

Figure 10:
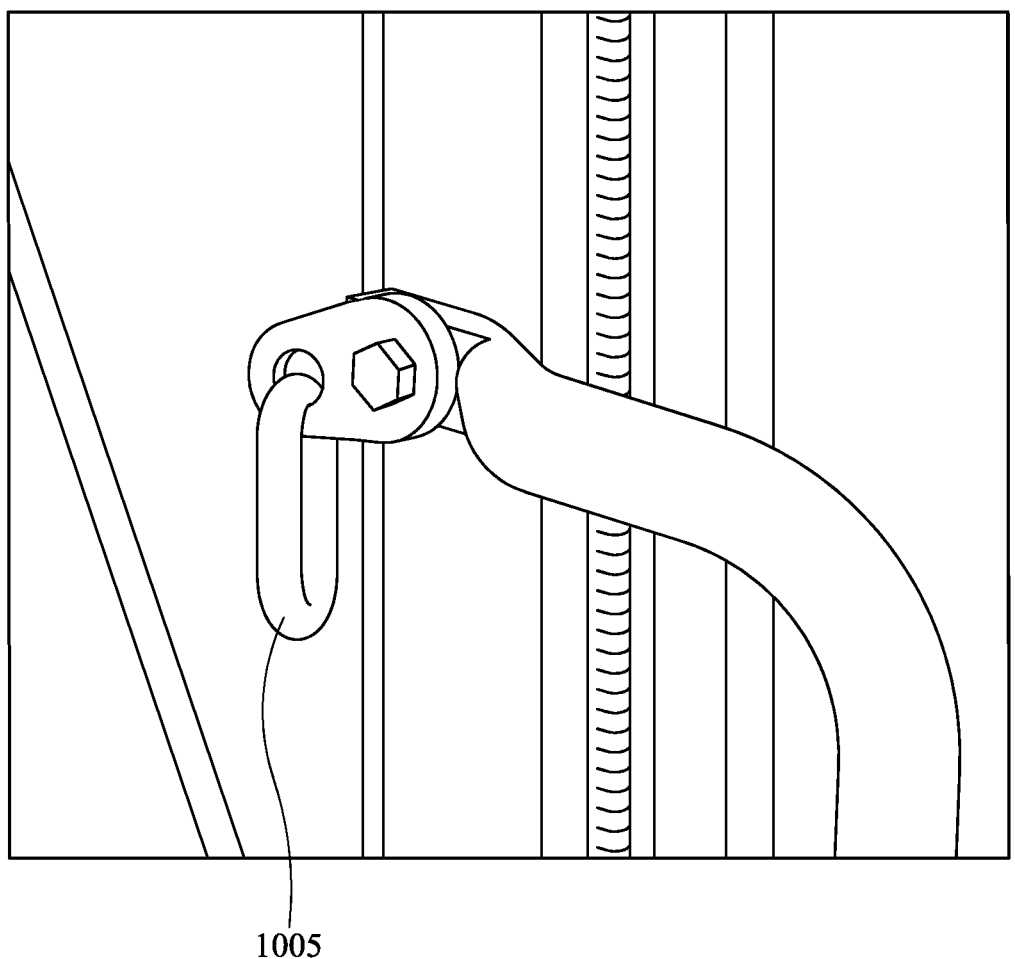
FIG. 10 is an illustration showing an internal safety tie off point, in accordance with some embodiments.
Figure 11:
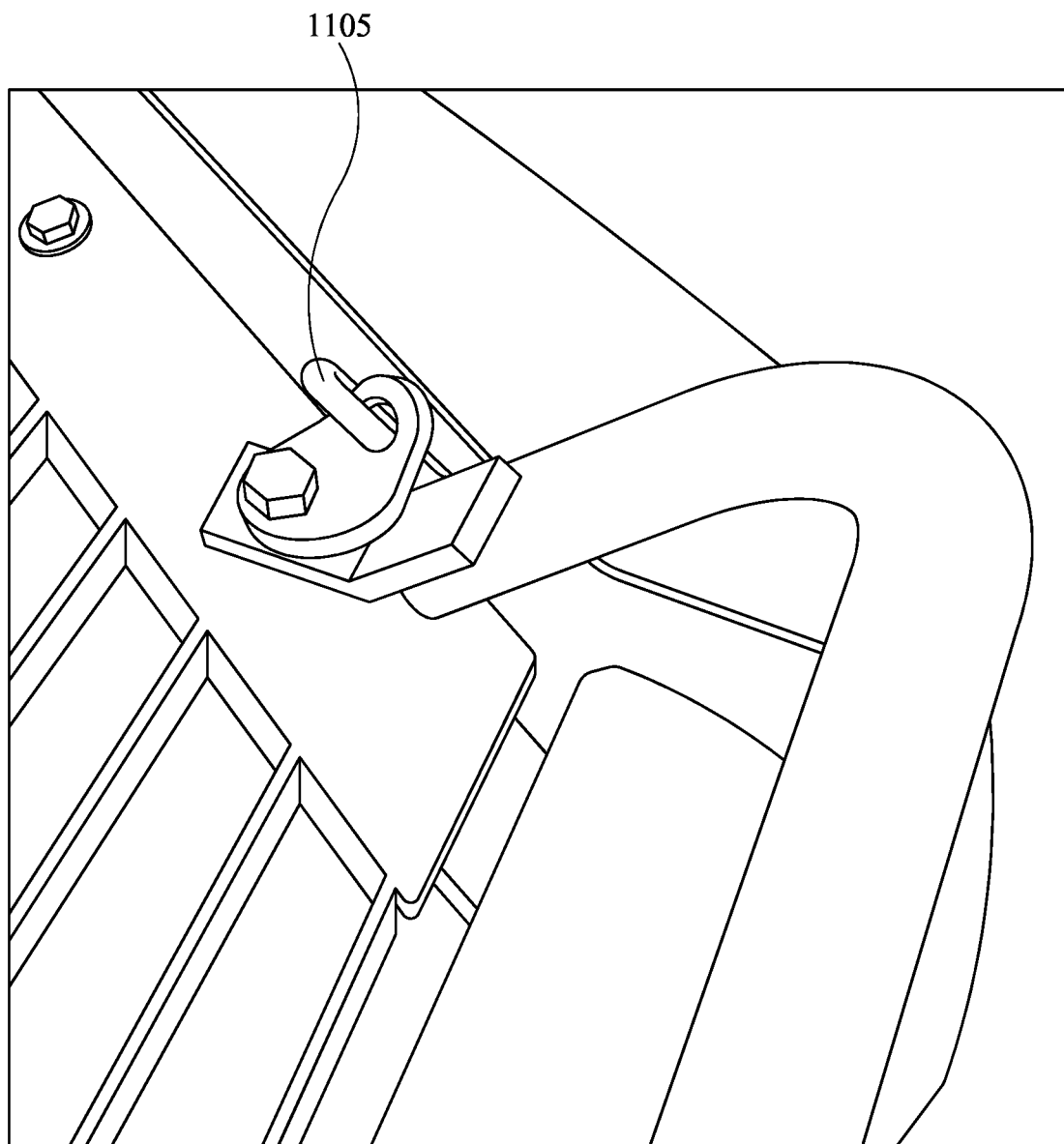
FIG. 11 is another illustration showing an external safety tie off point, in accordance with some embodiments.

In other instances, the safety tie off point need not be on the cab itself. For example and referring to FIG. 10, an interior safety tie off point 1005 is shown as being present inside a cab of a crawler excavator. An operator can tie off to this safety point 1005 before stepping outside of the cab. A second tie off can be made to an external safety tie off point, e.g., such as tie off point 905, before the safety harness is disconnected from the interior tie off point 1005. In this manner, the operator is always tethered/attached to at least one safety tie off point. In other examples, one or more safety tie off points can be present at other areas of the vehicle. For example, a safety tie off point 1105 (see FIG. 11) can be present at a back area of the vehicle where the engine compartment is located or at other areas of the vehicle that may need periodic inspection or servicing.

Figure 12:
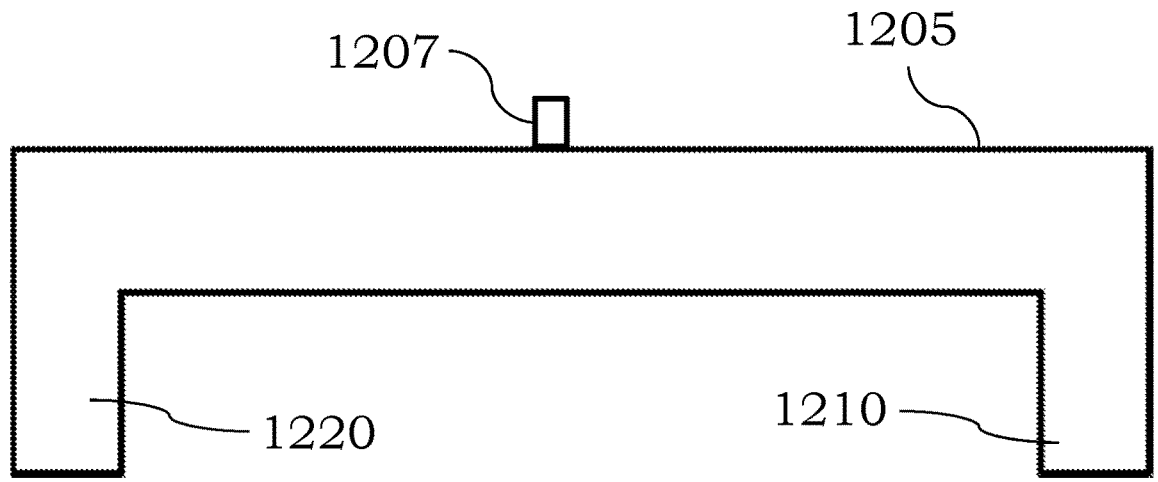
FIG. 12 is an illustration showing hydraulically adjustable outriggers, in accordance with some examples.

In certain configurations, the sled portion of the system may comprise hydraulically adjustable or actuatable outriggers such that a width of the outriggers can be altered. For example, it may be desirable to move the outriggers inward to engage an outer surface of the top of the rail car during unloading of the solid material from the rail car and to extend the outriggers away from the outer surface of the top of the rail car during movement of the vehicle or unloading of the vehicle from the rail car. Referring to FIG. 12, a side view of the outriggers 1210, 1220 on a sled 1205 is shown. The sled 1205 may comprise a coupler 1207 that can plug into the hydraulic system of the vehicle to receive a hydraulic fluid. The outriggers can be designed such that hydraulic coupling to the hydraulic system of the vehicle pushes them outward under pressure or to prevent the outriggers to return to a resting position. An operator may engage and disengage a button or switch in the cab of the vehicle to adjust a width of the outriggers as desired. Once the vehicle is properly placed on top of the rail car, the hydraulic pressure can be released so the outriggers 1210, 1220 slide inward and engage an outer side top surface of the rail car. This engagement assists in stabilizing the vehicle on top of the rail car. In other configurations, the outriggers may comprise a fixed width or may be manually adjustable to a desired width.

Figure 13:
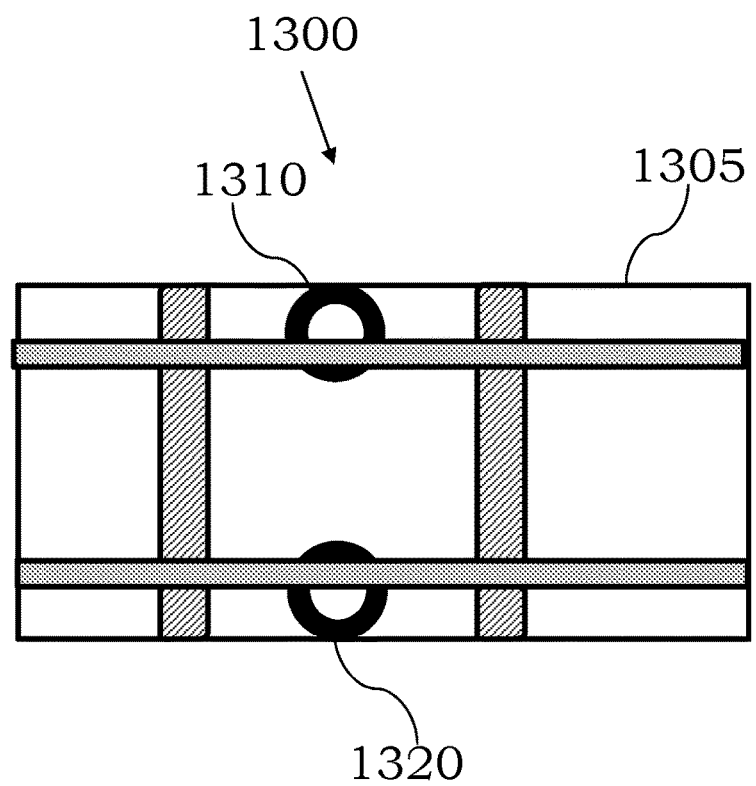
FIG. 13 is an illustration showing a sled with internal wheels configured to engage an interior surface of a rail car, in accordance with some embodiments.

In some examples, the sled portion of the system may also comprise wheels or similar means within the frame of the sled. For example and referring to FIG. 13, a top view of a sled is shown showing wheels 1310, 1320 that can engage an interior surface of the rail car to permit the sled to slide along the rail car and assist in stabilizing the sled on top of the rail car. Wheels can be present on a frame 1305, on cross members or on longitudinal members of the sled as desired, e.g., the sled may comprise 1, 2, 3, 4 or more wheels.

In certain embodiments, the vehicle and ramp can be used together as a system to permit mounting and unloading of a rail car. A sled can be reversibly coupled to the underside of the vehicle. The sled may comprise two fixed or adjustable outrigger beams which are adapted to engage and slidably engage the tops of the sides of an open top rail car. Mounted on the ends of the outrigger beams can be plates which guide the beams as they slide along the car top and slide plates which afford a sliding surface to facilitate the easy movement of the frame and equipment to which it is mounted. As noted herein, wheels can also be present if desired. The width of the outrigger beams can be made adjustable if desired by providing telescoping sections, e.g., portions which are hydraulically adjustable. The beams can be connected by longitudinal beams which connect at multiple locations to provide a sturdy frame. Mounted atop this configuration are pair of bracket moldings which are adapted to receive bolts which mount the frame to the underside of the unloading equipment. The sled can be mounted to the vehicle to allow the vehicle to move along its tracks or tires without interference from the frame as it moves up the ramp. This configuration allows the vehicle to move up the ramp under its own power and permits the vehicle to slide the sled along atop the rail car. As noted herein, the ramp may comprise an integral loading feature and can also serve as the trailer for the vehicle. The ramp may comprise two parallel beams connected by interspersed I-beams and comprise a pair of guide rails thereon which guide the tracked or wheeled equipment up the ramp to prevent it from getting too near the edge and tipping over. The tail end of the ramp may comprise a foldable section to facilitate the ramp to ground transition. The other end of the ramp has a connection with a vehicle hitch, ball or mount. The configuration is engaged with another trailer portion which has the standard trailer hookup for trailing and is detached when the ramp is used to facilitate loading of the vehicle atop railway cars. The vehicle itself can be used in combination with a loading feature on the ramp to elevate the ramp and allow the ramp to engage the top edge of the end of the last open top car to be loaded or unloaded.

When introducing elements of the aspects, embodiments and examples disclosed herein, the articles "a," "an," "the"

and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. A ramp configured to transport a vehicle to a rail car site and permit loading of the vehicle on top of a rail car using the ramp, the ramp comprising:
   a ramp frame comprising a pair of longitudinal members coupled to each other through at least a pair or cross members, wherein the longitudinal members are spaced apart from each other to permit a respective track of a crawler excavator vehicle to engage a top surface of one of the longitudinal members;
   a set of wheels coupled to the longitudinal members to permit transport of the ramp over a road; and
   a tow hitch positioned at a first end of the ramp and configured to couple to a tow vehicle to permit towing of the ramp by the tow vehicle, wherein the first end of the ramp further comprises a loading feature configured to reversibly couple to a loading member of the crawler excavator, wherein when the loading feature is coupled to the loading feature of the crawler excavator and the ramp is lifted the ramp remains substantially vertical to permit placement of the ramp at an end of an open top rail car, and wherein the loading feature is configured to automatically disengage the loading member when the crawler excavator climbs on top of a rail car using the placed ramp.

2. The ramp of claim 1, wherein the ramp frame comprises layered longitudinal members and cross members to prevent sagging of the ramp when the ramp is placed at the end of the open top rail car and when the crawler excavator is crawling up the ramp.

3. The ramp of claim 1, wherein the integral loading feature is configured as a clevis that can engage a loading feature of a bucket of the crawler excavator to permit the crawler excavator to lift the ramp vertically and place the ramp at the end of the open top rail car.

4. The ramp of claim 3, wherein the clevis is configured to automatically release from the loading feature of the crawler excavator when the crawler excavator is crawling up the ramp.

5. The ramp of claim 4, wherein the clevis is configured to automatically reengage the loading feature of the crawler excavator when the crawler excavator is crawling down from the top of the open top rail car on the ramp.

6. The ramp of claim 1, wherein the ramp comprises outriggers configured to engage a side surface of the open top rail car to keep the ramp from moving laterally.

7. The ramp of claim 1, wherein a top surface of the pair of longitudinal members comprise a high friction material to provide increased traction to a track of the crawler excavator that engages the top surface of the pair of longitudinal members.

8. The ramp of claim 1, wherein the ramp comprises a tailgate configured to prevent forward and backward motion when the ramp is engaged to the end of the open top rail car.

9. The ramp of claim 1, further comprising a second loading feature configured to reversibly couple to the loading member of the crawler excavator, wherein when the loading feature and the second loading feature is coupled to the loading member of the crawler excavator and as the ramp is lifted the ramp remains vertical to permit placement of the ramp at the end of an open top rail car, and wherein the loading feature and the second loading feature are configured to automatically disengage the loading member when the crawler excavator climbs on top of a rail car using the placed ramp.

10. The ramp of claim 9, wherein the loading feature and the second loading feature are positioned in a same plane along the ramp frame.

11. A sled attachment configured to reversibly couple to an independently powered vehicle, the sled attachment comprising:
    a frame comprising at least a pair of longitudinal members coupled to each other through at least a pair of cross members, wherein the frame is configured to reversibly couple to the independently powered vehicle at a top surface of the frame and to frictionally engage a top surface of an open top rail car at a bottom surface of the pair of cross members or a bottom surface of the pair of longitudinal members;
    at least a pair of outriggers extending laterally from the frame and each configured to engage an outer top edge of a respective side of the open top rail car, wherein the outriggers are positioned such that they are in front of and behind the vehicle when the frame is coupled to the vehicle, wherein a width of the outriggers is adjustable by a vehicle operator in a cab of the vehicle;
    skid means on each of said outriggers to engage the outer top edges the sides of a rail car to be loaded/unloaded by said vehicle, wherein the outriggers are coupled to the longitudinal members and positioned to permit the vehicle to move on its drive means when the vehicle is not on top the rail car and to permit the vehicle to float above the solid material when the vehicle is on top of the rail car, and wherein the outriggers are configured to engage the outer top edge of a respective side of the open top rail car when the vehicle is on top of the rail car to stabilize the vehicle during unloading of solid material in rail car, wherein the skid means comprises an anti-icing material on a surface that engages the outer top edge of the open top rail car.

12. The sled attachment of claim 11, wherein the frame further comprises wheels positioned to engage an upper interior surface of the open top rail car when the vehicle is on top of the rail car.

13. The sled attachment of claim 11, wherein the sled attachment ramp comprises gussets between the longitudinal members and the cross members to provide added strength.

14. The sled attachment of claim 11, wherein the sled attachment is configured to reversibly couple to the vehicle through orthogonal members that couple the sled attachment to the vehicle and prevent sag of the vehicle when it is on top of the rail car and floating above the solid material.

* * * * *